United States Patent [19]
Maltby

[11] 3,879,644
[45] Apr. 22, 1975

[54] PROBE RESPONSIVE TO CONDITIONS OF MATERIAL

[75] Inventor: Frederick L. Maltby, Montgomery County, Pa.

[73] Assignee: Drexelbrook Controls, Inc., Glenside, Pa.

[22] Filed: Oct. 20, 1972

[21] Appl. No.: 299,439

Related U.S. Application Data

[62] Division of Ser. No. 32,002, April 27, 1970, Pat. No. 3,706,980.

[52] U.S. Cl. .............. 317/246; 73/304 C; 324/61 P
[51] Int. Cl. ............................................. H01g 7/00
[58] Field of Search ............... 317/246; 73/304 C; 324/61 P

[56] References Cited
UNITED STATES PATENTS

| | | | |
|---|---|---|---|
| 2,802,178 | 8/1957 | Shafer | 317/246 X |
| 2,852,937 | 9/1958 | Maze | 317/246 X |
| 3,031,617 | 4/1962 | Paquette | 317/246 X |
| 3,119,266 | 1/1964 | Atkinson | 73/304 C |
| 3,188,538 | 6/1965 | Moe | 317/246 |
| 3,230,770 | 1/1966 | Hermanson | 317/246 X |
| 3,269,180 | 8/1966 | Schreiber | 73/304 C |
| 3,324,647 | 6/1967 | Jednak | 317/246 X |
| 3,400,331 | 9/1968 | Harris | 317/246 X |
| 3,436,653 | 4/1969 | Thiele | 317/246 UX |
| 3,515,987 | 6/1970 | Zurbrick | 317/246 X |
| 3,614,606 | 10/1971 | Schmidt | 317/246 X |

OTHER PUBLICATIONS

Revesz, "Probe Design for Capacitance Level Measurements," in Electronic Design, 8/60, Vol. 1, No. 16, p. 82–83.

*Primary Examiner*—E. A. Goldberg
*Attorney, Agent, or Firm*—Woodcock, Washburn, Kurtz & Mackiewicz

[57] ABSTRACT

In an RF system which measures the level of materials, the probe includes a measuring electrode and a guard shield. The guard shield is interposed between the electrode and a conductive member, commonly the container for the material, throughout the body of the probe.

2 Claims, 9 Drawing Figures

PROBE RESPONSIVE TO CONDITIONS OF MATERIAL

This is a division of application Ser. No. 32,002, filed Apr. 27, 1970 U.S. Pat. No. 3,706,980.

BACKGROUND OF THE INVENTION

This invention relates to systems for measuring the level of materials.

Capacitance type measuring systems have been used in industry for monitoring and measuring process conditions. An example of such a system is shown in U.S. Pat. No. 3,339,412 Maltby. Such systems measure the capacitance between an electrode and a conductive member, usually the vessel containing the material whose level is to be measured. Attempts have been made to include additional electrodes in the probe, for example, to prevent stray leakage between the measuring electrode and the vessel. One example of such a system is shown in the U.S. Pat. No. 3,119,266 Atkinson.

SUMMARY OF THE INVENTION

It is an object of this invention to provide a probe and a method of using a probe for sensing the condition of materials wherein the measurements made with the probe are substantially independent of changes in the dielectric constant of the probe insulation.

It is also an object of this invention to provide a probe and method of using a probe wherein the measurements made with the probe are not adversely affected by surface leakage currents.

It is also an object of this invention to provide a probe and method of using a probe wherein coatings of foreign materials attached to the exposed surfaces of the probe will have no adverse effect on the measurements made with the probe. Also foreign material which sticks to the exterior of probe has no adverse effect on the capacitance measurement.

In a preferred embodiment of the invention, a probe system responsive to the condition of materials comprises conductive means having material juxtaposed thereto, and a probe apparatus comprising a conductive probe electrode, solid insulation means and a hollow conductive guard shield having outer walls forming an interior cavity receiving a probe electrode where the guard shield is electrically insulated from the probe electrode and the conductive means by the solid insulation means. The solid insulation means contacts the guard shield such that one portion of the insulation means supports the probe electrode on the guard shield and another portion of the insulation means extends outwardly beyond the outer walls. The guard shield is interposed between the one portion and the other portion so as to substantially eliminate any current leakage path through the solid insulation means from the probe electrode through the other portion. The outer wall of the guard shield has a surface not covered by insulation means so as to be exposed to direct contact with the materials. The overall length of the exposed surface as measured in a direction from the probe electrode to the insulation means along a surface of the probe apparatus exposed to direct contact with the materials is substantially greater than the minimum thickness of the outer walls of the guard shield.

The foregoing and other objects, features and advantages of the invention will become more apparent from the following description, drawings, and appended claims.

DESCRIPTION OF A PARTICULAR EMBODIMENT

Figure 1:
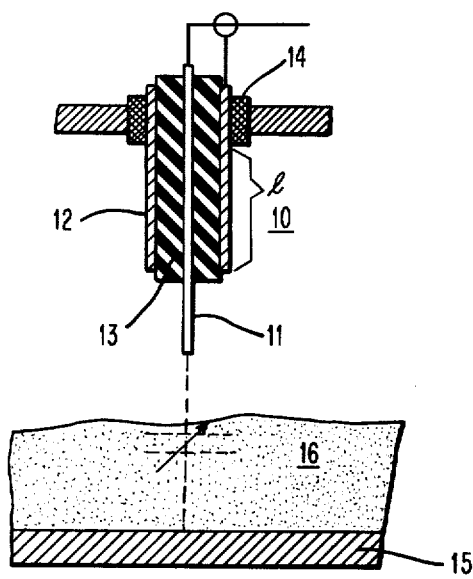
FIG. 1 shows a measuring probe.

Referring to FIG. 1 the probe apparatus 10 includes the conductive probe or measuring electrode 11 and a hollow conductive guard shield 12 having outer walls forming a hollow interior cavity. The insulation 13 is interposed between and in contact with the electrode 11 and the tubular guard shield 12 within the interior cavity. The outer insulation 14 extends outwardly beyond the shield 12 to the conductive mounting such that the guard shield is interposed between and in contact with probe electrode 11 and the insulation 14. The conductive mounting is normally electrically connected to the conductive member 15. The conductive member 15 normally is the container for the materials 16, the level of which is to be measured. The capacitance between the measuring electrode 11 having an elongated exposed surface and a surface of the conductive member 15 where the elongated surface of the electrode 11 extends perpendicular to the surface of member 15 is a measure of the level of this material. The conductive member 15 will be earth when the container is of glass or other non-conductive material.

In accordance with this invention, the guard shield is electrically interposed in every current path through the solid insulation from the electrode 11 to the insulation 14. Also, the guard shield is physically interposed between the area of contact between the insulation 14 and the conductive mounting and the portion of the probe electrode closest to the area of contact. Furthermore, the guard shield 12 has a surface which is exposed to direct contact with the materials (not covered by insulation). The overall length 1 of the exposed guard shield surface along a surface current path over the probe from the probe electrode 11 to the mounting is greater than the thickness of an accumulated coating on the probe as will be described with reference to FIG. 4.

Figure 2:
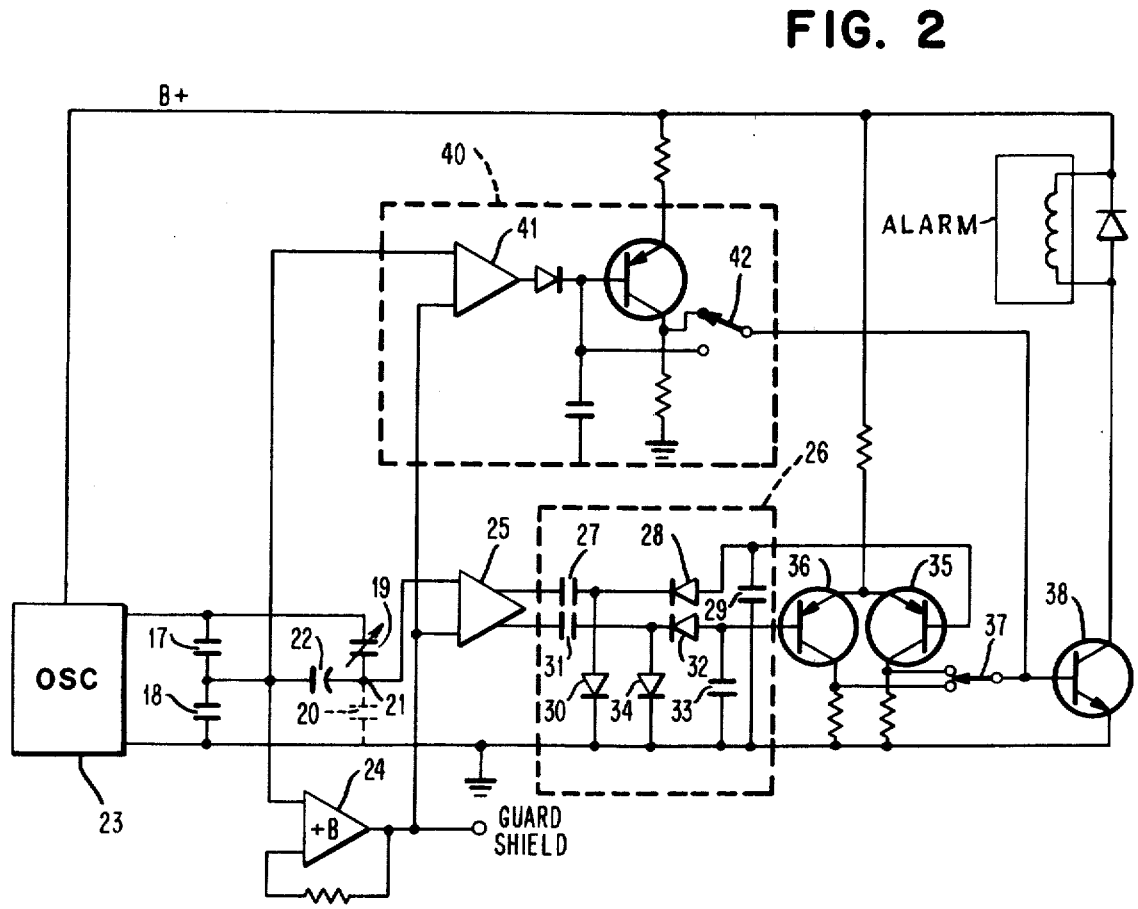
FIG. 2 shows the measuring system.

Referring to FIG. 2 a capacitance bridge includes first and second capacitors 17 and 18 connected in two fixed adjacent arms of the bridge. A fixed reference voltage less than the oscillated voltage, is produced by the capacitors 17 and 18. The opposite adjacent arms of the bridge include a manually adjustable capacitor 19 and the variable capacitor 20 between the measuring electrode 11 and the conductive member 15. A coaxial cable from the probe connects the measuring electrode 11 to the point 21 while the conductive member is connected to reference potential. A third capacitor 22 is connected between the junction of the two adjacent arms of the bridge and the junction of the opposite adjacent arms. A constant amplitude radio frequency oscillator 23 energizes the bridge. The outer conductor of the coaxial cable is connected to the guard shield. This becomes a part of the capacitor 22. Because of this, the length of cable can be varied without changing the operating point.

A first operational amplifier 24 has its input connected to the junction of the two fixed adjacent arms. The output of operational amplifier 24 is connected to the guard shield 12. The operational amplifier 24 has essentially 100 percent feedback which maintains the guard shield at the same potential as the measuring electrode when the bridge is balanced. The output of operational amplifier 24 is also connected to the output amplifier 25. The other input to the output amplifier 25 is from the measuring electrode.

The output of the output amplifier 25 represents the level of material being measured. As shown in FIG. 2 the instrument is used to provide on or off relay operation when the material reaches a preset point in the vessel. It will be understood, however, that the principles of this invention may also be used in a continuous measurement type system in which an output indicative of material level is obtained.

The output of amplifier 25 is applied to phase sensitive detector 26. For one phase, capacitor 27, diode 28, capacitor 29 and diode 30 form a peak holding rectifier whose output is equal to the peak-to-peak swing of the guard shield voltage plus the output voltage. For the same phase, capacitor 31, diode 32, capacitor 33 and diode 34 form another peak holding rectifier whose output is equal to the peak-to-peak swing of the difference between the guard shield and the output voltage. The functions of these two circuits are reversed for the opposite phase. At balance the voltage on capacitors 29 and 33 are equal. When there is a departure from balance in one direction, the voltage on capacitor 29 becomes more positive and the voltage on capacitor 33 becomes less positive. When there is a departure from balance in the opposite direction, the changes of voltage on capacitors 29 and 33 are opposite. The outputs of the phase sensitive rectifier are applied through emitter followers 35 and 36 to the selector switch 37.

Transistor 38 controls a relay 39 when the measured capacitance exceeds a preset limit. The relay contacts can be used to operate alarms, solenoid valves or other devices. One of two operating modes is selectable by the switch 37. On high level fail-safe the relay 39 drops out as the level of meterials exceeds a preset amount, that is, the capacitance exceeds a certain level. On low level fail-safe the relay drops out as the level of materials goes below a given amount, that is, the capacitance goes below a given level.

For proper operation of the system it is important that the operational amplifier 24 maintain the guard shield at the same potential as the measuring electrode for normal bridge balance condition. If foreign material, for example mud, is splashed between the guard electrode and the measuring electrode, there is no effect because the two are at the same potential. If mud is splashed between the guard electrode and ground, that is the container wall, the amplifier 24 has sufficient drive to keep the potential on the guard electrode constant.

Under certain conditions the deposit of foreign material may become so great that the amplifier 24 can no longer maintain the potential on the guard electrode. A guard shield monitor 40 has been provided to detect this condition and to deenergize the relay 39 when it occurs. The amplifier 41 measures the difference in voltage between the input and the output of the amplifier 24. When the difference exceeds a few millivolts the amplifier 41 acts through the selector switch 42 to cut off the relay 39. The selector switch 42 is positioned to one of its two positions in accordance with whether the system is operating in the high fail-safe or the low fail-safe mode.

Figure 2A:
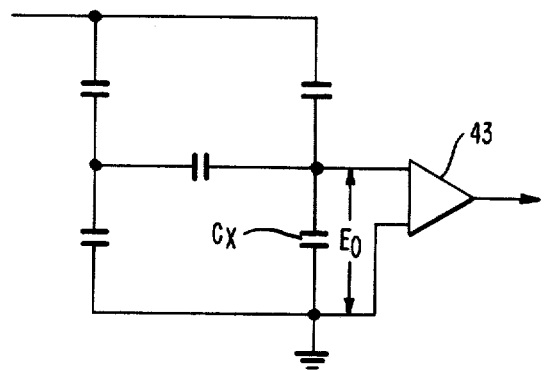
FIG. 2a shows the equivalent circuit of the prior art.
Figure 2B:
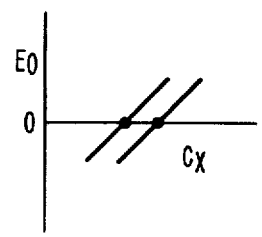
FIG. 2b shows the output voltage characteristics of the prior art.

The improved operating characteristics of the present invention can best be demonstrated with reference to FIGS. 2a–2d. FIG. 2a shows the equivalent circuit of the capacitance bridge which includes the unknown capacitance $C_x$, and the output amplifier 43. The output amplifiers in the prior art have been connected directly across the unknown capacitance. A change in the input impedance of the amplifier 43 will cause a shift in the zero point of the output voltage. FIG. 2b shows the output voltage as a function of capacitance for the prior art systems. The two lines show the operating characteristics for two different values of input impedance of the amplifier 43. It can be seen that a change in impedance causes a significant change in the capacity $C_x$ required for balance.

Figure 2C:
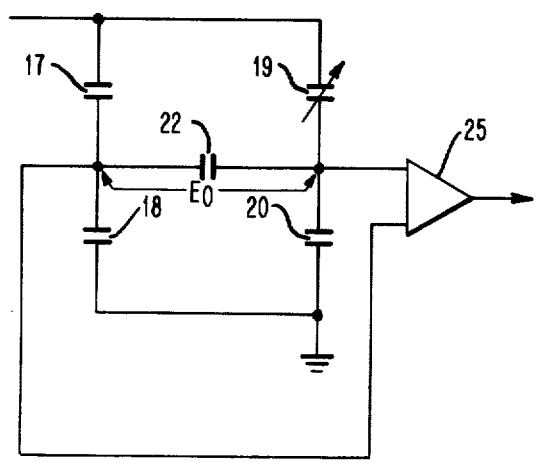
FIG. 2c shows the equivalent circuit of this invention.
Figure 2D:
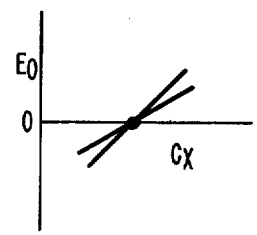
FIG. 2d shows the output voltage characteristics of the invention.
Figure 5:
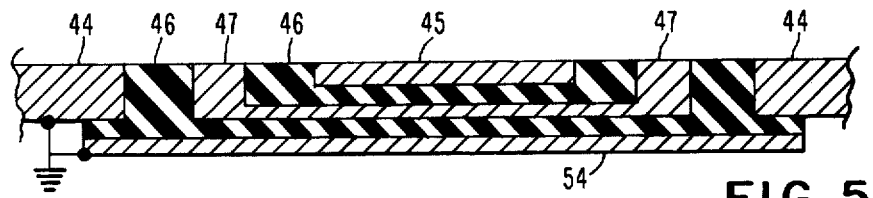
FIG. 5 is a cross-sectional view of the modification shown in FIG. 4 taken along section line 5—5.

On the other hand, the equivalent circuit of the present invention is shown in FIG. 2c. A change in the input impedance of the amplifier 25 merely changes the slope of the output voltage curve. This is shown in FIG. 2d. For the same change in input impedance of the amplifier, there is no change in the capacitance required for balance. When the capacitor 22 has a high value, which is desirable, the change in the slope is negligible.

Figure 3:
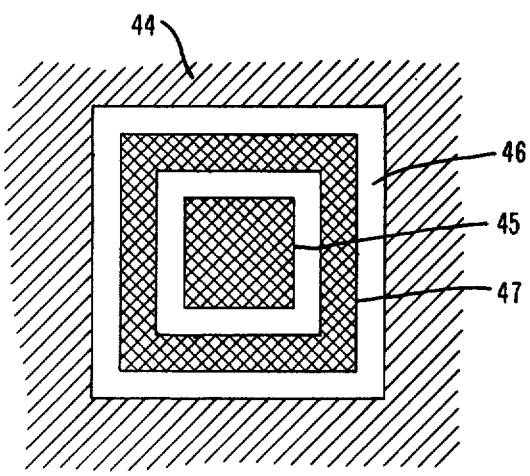
FIG. 3 shows a modification of the probe.

FIG. 3 shows a modification of the invention wherein the probe takes the form of a flush sensor. Such sensors are normally insulatingly mounted on the side of a container 44 to be filled with material. A flat piece of conductive material 45 is the measuring electrode. It is positioned on outer insulation 46 to isolate it from the container wall. The guard shield is a hollow rectangular cup of conductive material 47 having an exposed rim flush with an exposed surface of the electrode 45 and outer walls forming an interior cavity. The guard shield 47 completely surrounds but is insulated from, the measuring electrode 45 by insulation 46 within the interior cavity. Note that the portion of the guard shield behind the plate 45 is interposed between the grounded support member 54 and the electrode 45 so as to eliminate every current leakage path through the solid insulation means. Also, note that the overall length of the exposed surface of the guard shield 47 at the rim thereof as measured along the exposed surface of the flush sensor from the electrode 45 to the container wall is greater than the minimum thickness of the guard shield 47.

Figure 4:
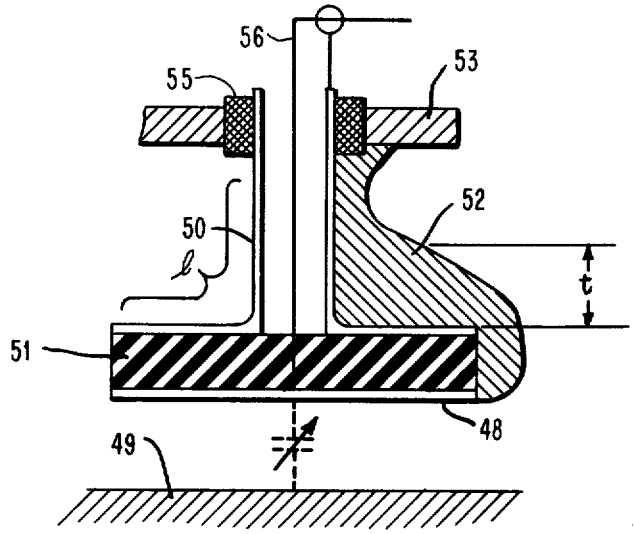
FIG. 4 shows another modification of the probe.

Another modification of the probe is shown in FIG. 4. The measuring electrode 48 is a flat surface of conductive material opposed to and extending parallel to the surface 49 of the material whose proximity is to be measured. The guard shield 50 is separated from the measuring electrode by interior insulation 51 and separated from the conductive mounting 53 by outer insulation 55. The guard shield 50 includes a flat portion horizontal and parallel to the measuring electrode throughout most of its area and a tubular portion extends vertically and perpendicularly away from the surface of the electrode to support the measuring electrode. A connecting wire 55 for the electrode 48 extends through the interior cavity in the tubular member formed by tubular outer walls. The guard shield is the only exposed area of support of the electrode and it is interposed between the area of contact between the insulation 54 and the mounting 53 and the portion of the probe electrode (the wire 56) closest thereto. When foreign materials, such as mud 52, are splashed on the probe, the capacitance measurement between the measuring electrode and the material surface will not be affected. Note that in the absence of the guard electrode mud splashed between the measuring electrode 48 and the support 53, electrically connected to the surface 49, would affect the capacitance measurement. Also note that the overall length 1 of the exposed surface of the shield 50 is greater than the thickness $t$ from any point on the surface of the coating to the closest point on the guard shield. The overall length 1 is also substantially greater than the minimum thickness of the shield 50.

All of the modifications of the probe of this invention have a common inventive feature. In all of the probes the guard shield extends throughout the body of the probe. This is as opposed to the construction shown, for example, in the aforementioned Atkinson patent wherein the guard electrode is on the surface of, but does not extend throughout the body of the probe.

The system described responds only to capacitive unbalance, not to resistive unbalance. In practice, there is a slight phase shift in amplifier 25 so the system will respond to small resistive unbalance.

While the connection of the output amplifier has been described with regard to a capacitance bridge, it will be appreciated that this technique of connecting the output amplifier has applicability to other measuring systems. The two fixed adjacent arms of the bridge merely provide means for producing a portion of the oscillator voltage. The operational amplifier 24 provides means for producing this portion of the oscillator voltage at a low impedance. Other techniques may be used to produce a portion of the oscillator voltage at a low impedance. For example, a resistance divider together with a high power oscillator would perform this function.

The foregoing and other modifications within the true spirit of the invention are intended to be covered by the appended claims.

What is claimed is:

1. A probe system responsive to the condition of materials comprising:
   conductive means having materials juxtaposed thereto; and
   a probe apparatuss comprising:
   a conductive probe electrode;
   solid insulation means;
   a hollow conductive guard shield having outer walls forming an interior cavity receiving said probe electrode, said guard shield being electrically insulated from said probe electrode and said conductive means by said solid insulation means; and
   said solid insulation means contacting said guard shield, one portion of said insulation means supporting said probe electrode on said guard shield and another portion of said insulation means extending outwardly beyond said outer walls, said guard shield being interposed between said one portion and said other portion so as to substantially eliminate any current leakage path through said solid insulation means from said probe electrode through said other portion;
   said outer walls having a surface not covered by said insulation means so as to be exposed to direct contact with the materials, said exposed surface having an overall length measured in a direction from said probe electrode to said insulation means along a surface of said probe apparatus exposed to direct contact with the materials, said overall length being substantially greater than the minimum thickness of said outer walls of said guard shield.

2. The probe system of claim 1 wherein said probe electrode comprises an elongated member and said hollow conductive guard shield comprises a tubular member, said one portion of said solid insulation means being located within said interior cavity for mounting said probe electrode within said cavity.

* * * * *